US008990225B2

United States Patent
Chow et al.

(10) Patent No.: US 8,990,225 B2
(45) Date of Patent: Mar. 24, 2015

(54) OUTBOUND CONTENT FILTERING VIA AUTOMATED INFERENCE DETECTION

(75) Inventors: Richard Chow, Sunnyvale, CA (US); Philippe J. P. Golle, San Francisco, CA (US); Jessica N. Staddon, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1788 days.

(21) Appl. No.: 11/957,833

(22) Filed: Dec. 17, 2007

(65) Prior Publication Data

US 2009/0157650 A1 Jun. 18, 2009

(51) Int. Cl.
  G06F 7/00 (2006.01)
  G06F 17/30 (2006.01)

(52) U.S. Cl.
  CPC .............. G06F 17/30893 (2013.01)
  USPC ......................................... 707/751

(58) Field of Classification Search
  USPC ................ 707/713, 758, 736, 999.101, 751
  See application file for complete search history.

(56) References Cited

U.S. PATENT DOCUMENTS

| | | | |
|---|---|---|---|
| 6,473,753 B1 * | 10/2002 | Katariya et al. | 1/1 |
| 6,654,735 B1 * | 11/2003 | Eichstaedt et al. | 707/749 |
| 7,272,637 B1 * | 9/2007 | Himmelstein | 709/217 |
| 7,412,478 B1 * | 8/2008 | Caruso et al. | 709/200 |
| 2003/0014395 A1 * | 1/2003 | Ruvolo et al. | 707/3 |
| 2004/0019499 A1 * | 1/2004 | Murashita | 705/1 |
| 2004/0186896 A1 * | 9/2004 | Daniell et al. | 709/207 |
| 2005/0065980 A1 * | 3/2005 | Hyatt et al. | 707/104.1 |
| 2005/0222985 A1 * | 10/2005 | Buchheit et al. | 707/3 |
| 2006/0020668 A1 * | 1/2006 | Chen et al. | 709/206 |
| 2007/0067297 A1 * | 3/2007 | Kublickis | 707/9 |
| 2007/0088687 A1 * | 4/2007 | Bromm et al. | 707/4 |
| 2008/0010277 A1 * | 1/2008 | Caruso et al. | 707/5 |
| 2008/0033955 A1 * | 2/2008 | Fujii | 707/9 |
| 2008/0133577 A1 * | 6/2008 | Noonan et al. | 707/102 |
| 2008/0195595 A1 * | 8/2008 | Masuyama et al. | 707/5 |
| 2009/0037454 A1 * | 2/2009 | Sampson et al. | 707/102 |
| 2009/0094240 A1 * | 4/2009 | Bordeaux et al. | 707/7 |

* cited by examiner

*Primary Examiner* — Hosain Alam
*Assistant Examiner* — Eliyah S Harper
(74) *Attorney, Agent, or Firm* — Shun Yao; Park, Vaughan, Fleming & Dowler LLP

(57) ABSTRACT

One embodiment of the present invention provides a system that facilitates filtering outbound content via inference detection. During operation, the system identifies content sent to a first address and extracts keywords from the identified content. The system then issues queries based on these keywords and extracts expected-content keywords from the hits returned in response to the queries. The system then searches the outbound content for occurrences of the expected-content keywords and produces a result which allows a user to determine whether the outbound content is proper. In a further embodiment, the system extracts keywords from a piece of outbound content, and issues queries based on these keywords. The system then extracts keywords from the hits, and present at least one keyword to a user, thereby allowing the user to determine whether the outbound content is proper.

16 Claims, 4 Drawing Sheets

OUTBOUND CONTENT FILTERING VIA AUTOMATED INFERENCE DETECTION

RELATED APPLICATIONS

The instant application is related to U.S. patent application Ser. No. 11/729,576, entitled "Method and System for Detecting Undesired Inferences from Documents," filed 28 Mar. 2007; U.S. patent application Ser. No. 11/951,198, entitled "Inbound Content Filtering via Automated Inference Detection," filed 5 Dec. 2007; and U.S. patent application Ser. No. 11/947,292, entitled "Augmenting Privacy Policies with Inference Detection," filed 29 Nov. 2007; which are incorporated by reference herein.

FIELD OF THE INVENTION

The present invention relates to the design of intelligent data processing. More specifically, the present invention relates to a method and system for outbound content filtering via inference detection.

RELATED ART

The relentless growth of the Internet has brought unprecedented productivity increase to almost every industry. Internet-based communication applications, such as emails and Web-based programs, are quickly replacing conventional, slower communication channels, such as postal mail and bulletin boards. A typical day at work often involves sending numerous emails and/or posting information on Web pages. Such convenience has significantly improved our work efficiency because information can now be disseminated almost instantaneously at very low costs.

However, most Internet-based information dissemination applications are also more prone to human errors. For example, one can mistype an email address and inadvertently send out information that is not intended for the recipient. Furthermore, the current email protocols, while allowing for timely delivery, also make it very difficult to retract a mistakenly sent email. Conventional content filtering technologies are not suitable for catching such human errors, because these technologies are largely based on static lists of keywords and/or addresses, whereas the outbound content is often dynamic and unpredictable.

SUMMARY

One embodiment of the present invention provides a system that facilitates filtering outbound content via inference detection. During operation, the system identifies previously sent content with a common first destination identifier and extracts a set of keywords from the identified previously sent content. The system then issues a number of Web search queries based on the keywords extracted from the identified content, receives a number of hits in response to the queries, and extracts a set of expected-content keywords from the hits. The system further associates the expected-content keywords with the first destination identifier. After the system receives a piece of outbound content, the system determines the number of expected-content keywords present in the outbound content. The system then produces a result which indicates the destination identifier for the outbound content and at least one expected-content keyword present in the outbound content, thereby allowing a user to determine whether the outbound content has the proper content and destination identifier.

In a variation on this embodiment, extracting the expected-content keywords from the hits involves ranking the expected-content keywords.

In a further variation, extracting the expected-content keywords from the hits involves determining a term-frequency inverse-document-frequency (TF.IDF) weight for a respective word or phrase contained in a respective document.

In a variation on this embodiment, the system determines whether the outbound content's destination identifier matches the first destination identifier.

In a further variation, producing the result involves issuing a warning to the user when the outbound content's destination identifier matches the first destination identifier and the number of expected-content keywords present in the outbound content is below a predetermined threshold, or when the outbound content's destination identifier does not match the first destination identifier and the number of expected-content keywords present in the outbound content is above a predetermined threshold.

One embodiment of the present invention provides a system that facilitates filtering outbound content via inference detection. During operation, the system receives a piece of outbound content and extracts keywords from the outbound content. The system then issues Web queries based on the keywords and extracts keywords from documents corresponding to the hits returned by a search engine in response to the queries. The system further ranks the keywords extracted from the hits and selects one or more ranked keywords to represent the outbound content. The system then produces a result which indicates a destination identifier for the outbound content and at least one keyword which is selected to represent the outbound content, thereby allowing a user to determine whether the outbound content has the proper content and destination identifier.

In a variation on this embodiment, extracting keywords from the outbound content involves determining a TF.IDF weight for a respective word or phrase contained in the outbound content.

In a further variation, extracting keywords from the hit documents involves determining a TF.IDF weight for a respective word or phrase contained in a respective document.

In a variation on this embodiment, ranking the keywords extracted from the hit documents involves determining the number of hit documents which contain a respective keyword.

In a variation on this embodiment, ranking the keywords extracted from the hit documents comprises determining the number of queries which result in at least one hit document that contains a respective keyword.

DETAILED DESCRIPTION

Figure 1:
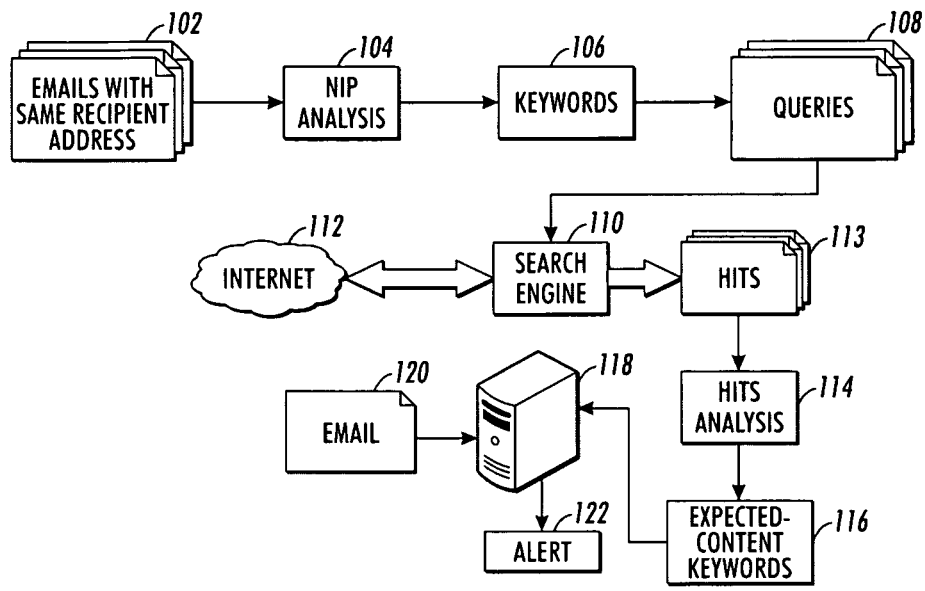
FIG. 1 illustrates an exemplary block diagram for a system that examines an outbound email based on expected-content keywords obtained by Web-based inference detection in conjunction with previous emails in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Embodiments of the present invention provide automated techniques for detecting inferences drawn from the content of one or more documents. Such techniques can be used to manage or filter outbound content. In particular, such inference-detection techniques can facilitate detection of unintended information contained in outbound content, such as emails, and thereby reducing the amount of inadvertently transmitted information. Note that the term "outbound content" refers to any type of content that is to be sent from a user's system to another system. Such content can include, but is not limited to, emails, Web postings, instant messages, and other forms of text-based documents.

For example, users often rely on an email client program's "auto-complete" features when typing a recipient's email address. A typical auto-complete feature allows a user to type only the first few letters of a recipient's email address or name and automatically completes the entire email address with a previously stored address that begins with the same letters. The auto-complete feature saves time and relieves the user of the burden of remembering complete email addresses. However, an auto-complete feature may favor the most frequently or recently used address, which could lead to an incorrectly entered address if the user does not catch the mistake. An incorrectly entered address could cause email bounces and, in worse cases, allow sensitive information to be sent to the wrong recipient.

In a more specific example, suppose user Bob wishes to share the photos of his new born baby with his friend Alice. However, Bob has been sending many emails in the past to his client, Alison. When Bob starts to type the first three letters of the name "Alice," the email program automatically completes the recipient's address field with Alison's email address. Relying on the email program and not double-checking the actual email address, Bob types up the email body, attaches the photos, and hits the "send" button. As a result, Bob inadvertently sends a personal email to his client Alison.

Conventional content-filtering techniques are not very useful in this situation. These techniques are largely based on static keyword or address lists. It would be very difficult for a user to construct a sensitive keyword list for each recipient address. Moreover, emails (and outbound content in general) often contain information that obscures the true subject matter contained therein. Sometimes, a piece of outbound content may not contain explicit words pertaining to a subject matter, but may nevertheless allow the recipient to infer the subject matter. For instance, suppose a user wishes to avoid sending any outgoing content (e.g., emails, blog posts) that pertains to Osama Bin Laden to certain recipients. The filtering system can filter any email or blog posts containing explicit identifying information, e.g., words such as "Osama," "Bin," "Laden," and "OBL." However, when a piece of content does not contain any explicit identifying word, it can pass the filtering system and still be recognized as pertaining to Osama Bin Laden. For example, an email containing the language "the son of a Saudi construction magnate who came from Yemen" allows a recipient to infer that the subject matter of this sentence is Osama Bin Laden, because a Web search with the query "Saudi construction magnate Yemen" returns numerous hits about Osama Bin Laden. Nevertheless, the filtering system would not be able to catch this email.

Embodiments of the present invention provide novel techniques that allow dynamic updates of keyword lists and detect inferences in the outbound content, thereby preventing undesired information from being sent out inadvertently. In some embodiments, a large corpus such as the Web or data stored on a corporate intranet is used as a proxy for human knowledge to enable understanding of what inferences can be drawn from a document, such as an outgoing email or a Web posting. One technique is to extract keywords from a document, use these keywords to construct search engine queries, and analyze the results (also referred to as "hits") returned in response to these queries.

In this disclosure, the term "corpus" refers to a collection of documents. In one embodiment, a corpus can include all the documents available on the Web. The corpus can also be a collection of documents internal to an organization. Additionally, the system can operate based on one or more corpora.

FIG. 1 illustrates an exemplary block diagram for a system that examines an outbound email based on expected-content keywords obtained by Web-based inference detection in conjunction with previous emails in accordance with an embodiment of the present invention. During operation, the system first identifies previously sent emails with a common recipient address 102. The system then performs natural language processing (NLP) analysis 104 to emails 102. As a result, the system obtains a set of keywords 106 from emails 102.

The system then constructs a set of Web search queries 108 based on keywords 106, and issues these queries to a search engine 110. Search engine 110 then conducts searches on the Internet 112 and returns a number of hits 113 for each query. The system then performs an NLP analysis 114 on the hits, and extract a number of keywords 116. Keywords 116 are the result of inference detection based on previously received emails 102, and therefore can be used to represent the expected content of an outbound email.

Subsequently, an email filtering system 118 checks an outbound email 120 against expected-content keywords 116. Based on whether outbound email 120's recipient address is the same as that for emails 102, and based on the number of expected-content keyword matches in outbound email 120, filtering system 118 issues an alert 122 to remind the user when the content of outbound email 120 appears to be inconsistent with its recipient address.

Figure 2:
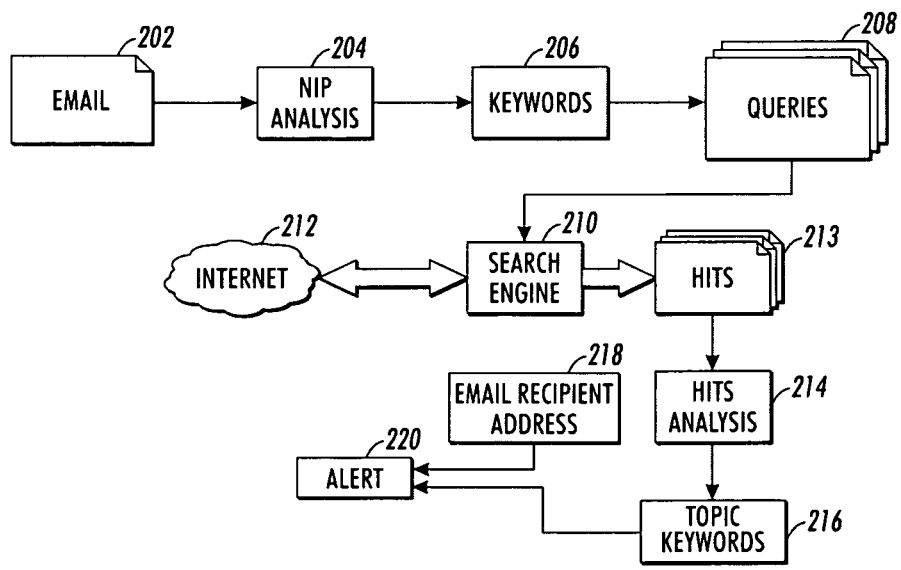
FIG. 2 illustrates an exemplary block diagram for a system that performs Web-based inference detection on an outbound email in accordance with an embodiment of the present invention.

FIG. 2 illustrates an exemplary block diagram for a system that performs Web-based inference detection on an outbound email in accordance with an embodiment of the present invention. During operation, the system receives an outbound email 202 and performs a set of NLP analysis 204 to email 202. As a result, the system obtains a set of keywords 206 from outbound email 202. Based on keywords 206, the system constructs a set of Web search queries 208 and issues these queries to a search engine 210.

In response, search engine 210 searches Internet 212 and receives a number of hits 213 for each query. The system then performs analysis 214 to hits 213, and extracts a set of topic keywords 216. Subsequently, the system issues an alert message 220 indicating topic keywords 216 and outbound email 202's recipient address 218, thereby allowing a user to confirm that outbound email 202 has the correct content.

Filtering Outbound Emails with Expected-Content Keywords

In one embodiment, the system uses a database of correctly addressed emails to generate a set of knowledge of expected content for emails with the same recipient address. In one embodiment, the system extracts keywords from all the emails sent to a certain address, and optionally ranks these keywords by popularity. For example, the most popular keywords associated with emails to a user's friend may include "pic," "baby," and "kid." Then, the system issues a number of Web search queries based on these keywords. In response, the system receives a number of hits, and extracts a second set of keywords from these hits. This second set of keywords extracted from the hit documents are considered to represent the expected content of an email with the same recipient address as those identified previously sent emails. When the number of occurrences of any of these expected-content keywords in an outbound email addressed to the same recipient drops below a certain threshold, the system issues an alert to the user. Alternatively, if the outbound email has a different recipient address, but the expected-content keyword occurrences in the email is above a certain threshold, the system can also issue an alert to the user.

One implementation of this embodiment involves the following operations:

1. The system identifies previously sent emails with a common recipient address.
2. The system extracts keywords from the emails. In one embodiment, the system uses NLP techniques to extract a number of top-ranked keywords.
3. The system issues a number of queries based on the keywords to a search engine, and receives a number of hits in response. The system subsequently performs another NLP analysis to extract the expected-content keywords from the hits.
4. The system then determines whether an outbound email with the same recipient address has sufficient number of expected-content keyword matches, or whether an outbound email with a different recipient address has too many expected-content keyword matches. The system issues an alert to the user accordingly.

In one embodiment, to extract keywords from the emails and to extract keywords from the hit documents, the system applies automated content analysis to these documents. The system can use any NLP tool, ranging from text extraction to in-depth linguistic analysis. In one embodiment, the system selects the keywords based on a "term frequency-inverse document frequency" (TF.IDF) analysis. Note that the term "keyword" as used in this disclosure is not limited to a single word, but can include words, phrases, abbreviations, synonyms, or any combination of language symbols.

In a TF.IDF analysis, the system assigns a respective word in an email a TF.IDF weight. The system uses this weight, which is a statistical measure, to evaluate how important the word is to a document (i.e., the email) in a corpus (e.g., all the emails stored in a corporation's database or server). The importance of a word increases proportionally with the number of times the word appears in the document, but is offset by the frequency of the word occurrence in the corpus. For example, the TF.IDF weight of a term i, denoted as $t_i$, with regard to a given document, can be computed as follows:

$$W_{TF.IDF} = \frac{n_i}{\sum_k n_k} \cdot \log \frac{|D|}{|\{d: t_i \in d\}|}.$$

In this formula, term frequency $$\frac{n_i}{\sum_k n_k}$$

is the number of occurrences of $t_i$ in the document, normalized by all the term occurrences in the document. The inverse document frequency, $$\log \frac{|D|}{|\{d: t_i \in d\}|},$$

is a measure of the general importance of the term and is computed as the logarithm of the number of all documents in the corpus divided by the number of documents containing the term $t_i$.

The above formula for computing TF.IDF weight is only one example of TF.IDF definition. For different applications, different TF.IDF definitions can be adopted. In addition, embodiments of the present invention can also use other linguistic analysis approaches to extract keywords from a document.

Figure 3:
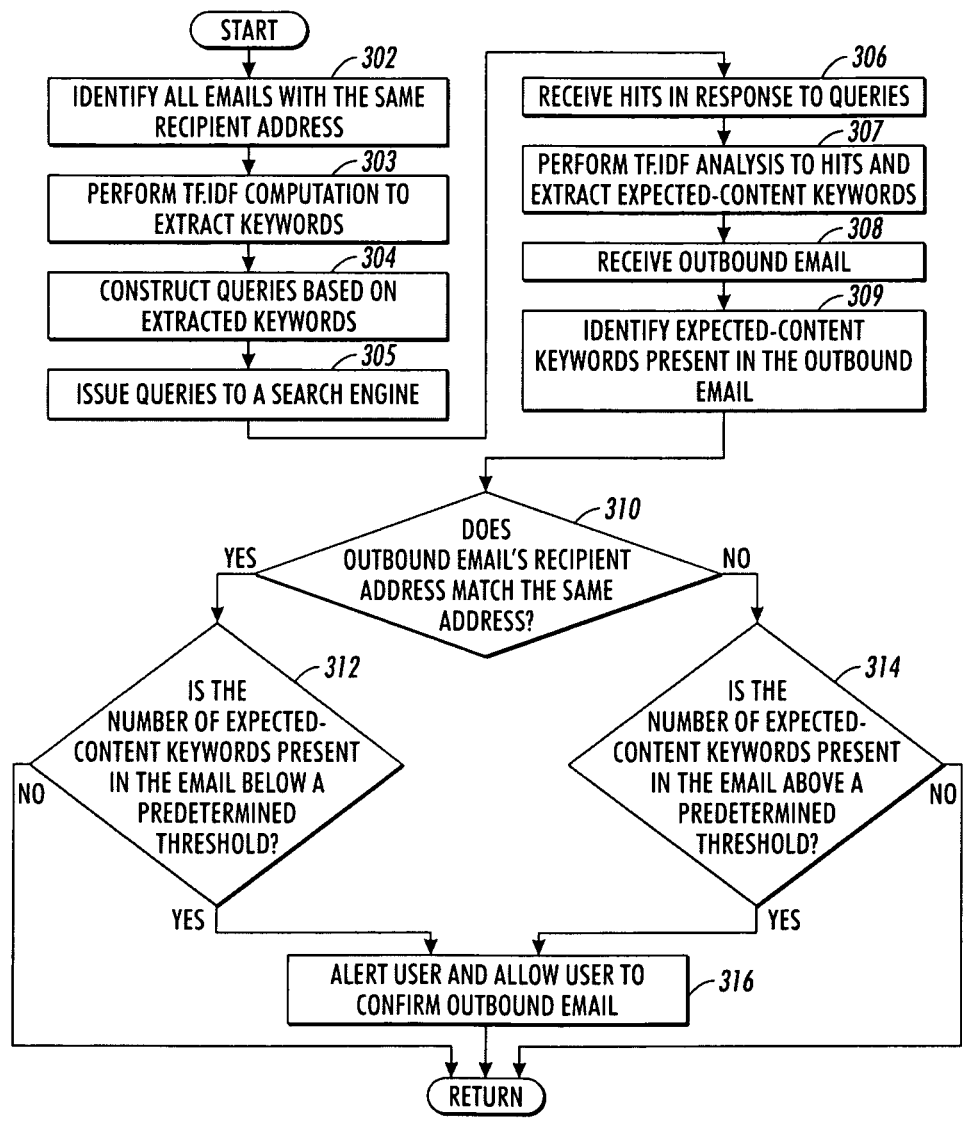
FIG. 3 presents a flow chart illustrating an exemplary process of examining an outbound email based on expected-content keywords obtained by Web-based inference detection in conjunction with previous emails in accordance with an embodiment of the present invention.

FIG. 3 presents a flow chart illustrating an exemplary process of examining an outbound email based on expected-content keywords obtained by Web-based inference detection in conjunction with previous emails in accordance with an embodiment of the present invention. During operation, the system first identifies all emails with the same recipient address (operation 302). The system then performs TF.IDF analysis to these emails and extracts a set of keywords (operation 303). Note that the system can optionally rank the keywords based on their TF.IDF weight. Additionally, the number of keywords to be extracted can be a parameter tunable by the user based on the desired running time and thoroughness of the inference detection.

The system then constructs a number of queries based on the keywords extracted from previous emails (operation 304). Subsequently, the system issues queries to a search engine (operation 305). In response to these queries, the system receives a number of hits from the search engine (operation 306). The system then performs another TF.IDF analysis to the received hits and extracts the expected-content keywords (operation 307)

Next, the system receives an outbound email (operation 308). The system identifies the expected-content keywords which are present in the outbound email (operation 309). Subsequently, the system determines whether the outbound email's recipient address matches the same address of the emails identified in operation 302 (operation 310). If the outbound email has the same recipient address, the system further determines whether the number of expected-content keywords present in the outbound email is below a predetermined threshold (operation 312). If so, the system issues an alert to the user which allows the user to confirm that the outbound email content and/or recipient address are correct (operation 316). Otherwise, the system returns.

If the outbound email has a different recipient address, the system then determines whether the number of expected-content keywords present in the outbound email is above a predetermined threshold (operation 314). If so, the system issues an alert to the user which allows the user to confirm that the outbound email content and/or recipient address are correct (operation 316). Otherwise, the system returns.

Note that the process described above also applies to other forms of outbound content, such as Web postings. Instead of email addresses, the system can use any type of destination identifying information, such as a Web address, a domain name, an Internet Protocol (IP) address, or a range of IP addresses. For example, the system can identify all past blog postings to the same blog address, and obtain expected-content keywords from these postings. In general, the system can associate expected-content keywords with any form of destination identifier.

Web-Based Inference Detection on Outbound Email

One embodiment of the present invention uses the Web to associated one or more topics with an outbound email. The system then presents the user with the identified topic and allows the user to confirm, prior to sending the email, that the topic is correct with respect to the email's recipient. For example, in the aforementioned example, the system can notify user Bob with a topic of the email as "photo sharing" and ask Bob "Is it OK to send Alison a message about photo sharing?" This alert message allows user Bob to double check the content and recipient address of the email and avoid an embarrassing mis-sent email to his client.

In one embodiment, the system identifies inferences in an outbound email by performing the following operations:

1. The system extracts keywords from the outbound email using, for example, a TF.IDF analysis.

2. The system issues Web search queries to a search engine based on various subset and combinations of the extracted keywords. The number of such subsets is a parameter tunable by the user based on the desired running time and depth of inference detection.

3. For each query issued, the system extracts a set of keywords from the returned hits.

4. The system ranks the extracted keywords according to the number of hits that contain a respective keyword and/or the number of queries that result in at least one hit that contains a respective keyword. Other ranking methods are also possible.

5. The system selects one or more of the most highly ranked keywords as the topic keywords to be associated with the email. The system further displays the topic keywords and the recipient address of the email to the user, thereby allowing the user to confirm the content before sending the email.

Figure 4:
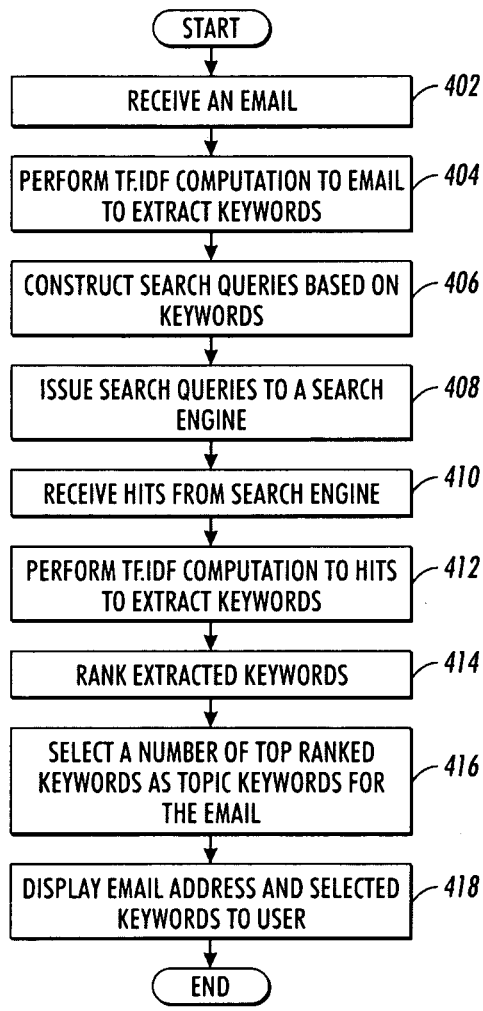
FIG. 4 presents a flow chart illustrating an exemplary process of performing Web-based inference detection on an outbound email in accordance with one embodiment of the present invention.

FIG. 4 presents a flow chart illustrating an exemplary process of performing Web-based inference detection on an outbound email in accordance with one embodiment of the present invention. During operation, the system receives an outbound email (operation 402). The system then performs TF.IDF computation to the outbound email and extracts a set of keywords (operation 404). In one embodiment, the corpus used for the TF.IDF computation could be all the emails stored in a corporation's database or server. The system further constructs a number of search queries based on the extracted keywords (operation 406).

Next, the system issues the search queries to a search engine (operation 408). In response, the system receives a number of hits corresponding to each query from the search engine (operation 410). Subsequently, the system performs TF.IDF computation to the hits to extract another set of keywords (operation 412). In one embodiment, the corpus used for the TF.IDF computation could be all the emails stored in a corporation's database or server, or could be a general corpus, such as the Brown Corpus of Standard American English. The system then ranks the keywords extracted in operation 412 based on the number of hits that contain a respective keyword and/or the number of queries that result in a hit containing the keyword (operation 414).

The system further selects a number of top ranked keywords as topic keywords for the outbound email (operation 416). The system then displays the email address and the selected topic keywords to the user, thereby allowing the user to confirm that the email has the correct content (operation 418).

Note that the process described above also applies to other forms of outbound content, such as Web postings. Instead of email addresses, the system can use any type of destination identifying information, such as a Web address, a domain name, an IP address, or a range of IP addresses. In general, the system can associate the keywords extracted from the hits with any form of destination identifier.

System Operation

Figure 5:
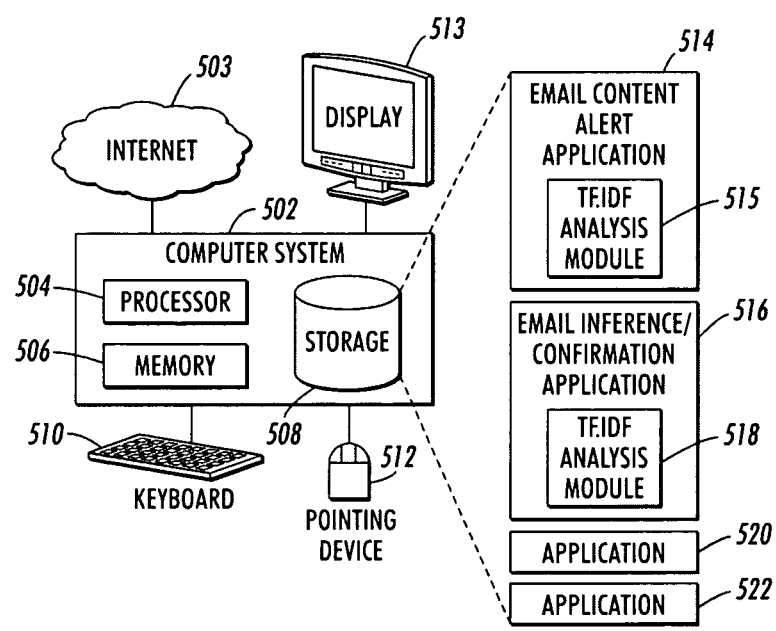
FIG. 5 illustrates a computer system for filtering outbound emails via inference detection in accordance with one embodiment of the present invention.

FIG. 5 illustrates a computer system for filtering outbound emails via inference detection in accordance with one embodiment of the present invention. A computer system 502 includes a processor 504, a memory 506, and a storage device 508. Computer system 502 is coupled to the Internet 503, a display 513 a keyboard 510, and a pointing device 512. Storage device 508 stores an email content alert application 514, which in one embodiment performs the process described in FIG. 3, and an email inference/confirmation application 516, which in one embodiment performs the process described in FIG. 4. Storage device 508 also stores applications 520 and 522. Email content alert application 514 includes a TF.IDF analysis module 515. Similarly, email inference/confirmation application 516 includes a TF.IDF analysis module 518. During operation, email content alert application 514 and/or email inference/confirmation application 516 are loaded into memory 506 and executed by processor 504. Correspondingly, processor 504 performs outbound email filtering based on inference detection as described above.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for filtering outbound content via inference detection, the method comprising:

identifying previously sent content associated with a common first destination identifier;

extracting a set of keywords from the identified previously sent content;

issuing a set of web search queries that each includes one or more of the extracted keywords to obtain a set of search results;

extracting a set of candidate keywords from the set of search results;
performing inference detection using the set of search results for the extracted keywords;
determining, from the set of candidate keywords, a set of expected-content keywords which are determined to be representative of the previously sent content based on the inference detection;
responsive to receiving a piece of outbound content, determining whether the outbound content is proper, which involves performing one of:
  determining that the outbound content is associated with the first destination identifier, and the number of expected-content keywords present in the outbound content is below a first predetermined threshold; and
  determining that the outbound content is not associated with the first destination identifier, and the number of expected-content keywords present in the outbound content is above a second predetermined threshold; and; and
responsive to the outbound content being improper, displaying the destination identifier for the outbound content and at least one expected-content keyword present in the outbound content.

2. The method of claim 1, wherein determining the set of expected-content keywords from the search results comprises ranking the expected-content keywords.

3. The method of claim 1, wherein determining the set of expected-content keywords from the search results comprises determining a term-frequency inverse-document-frequency (TF.IDF) weight for a respective word or phrase contained in a respective document.

4. A computer-executed method for filtering outbound content via inference detection, the method comprising:
  receiving a first piece of outbound content associated with a destination identifier;
  extracting keywords from the first piece of outbound content;
  issuing a set of web queries that each includes one or more of the extracted keywords to obtain a set of search results;
  extracting a set of candidate keywords from the search results returned by a search engine in response to the queries;
  performing inference detection using the set of search results for the extracted keywords;
  determining, from the set of candidate keywords, a set of expected-content keywords which are determined to be representative of the previously sent content based on the inference detection;
  ranking the set of candidate keywords extracted from the search results based on a confidence value generated using web-based inference detection, wherein the confidence value evaluates the candidate keyword's sensitivity to expected content;
  selecting one or more top ranked keywords to represent the first piece of outbound content;
  responsive to receiving a second piece of outbound content, determining whether the second piece of outbound content is proper, which involves performing one of:
  determining that the second piece of outbound content is associated with the first destination identifier, and the number of expected-content keywords present in the second piece of outbound content is below a first predetermined threshold; and
  determining that the second piece of outbound content is not associated with the first destination identifier, and the number of expected-content keywords present in the second piece of outbound content is above a second predetermined threshold; and
  responsive to the second piece of outbound content being improper, displaying the destination identifier for the second piece of outbound content, the selected one or more top ranked keywords to represent the first piece of outbound content, and at least one expected-content keyword selected to represent the second piece of outbound content, thereby allowing a user to determine whether the second piece of outbound content has the proper content and destination identifier.

5. The method of claim 4, wherein extracting keywords from the first piece of outbound content comprises determining a TF.IDF weight for a respective word or phrase contained in the first piece of outbound content.

6. The method of claim 4, wherein extracting candidate keywords from the search results comprises determining a TF.IDF weight for a respective word or phrase contained in a respective document.

7. The method of claim 4, wherein ranking the keywords extracted from the search results comprises determining the number of documents which contain a respective keyword.

8. The method of claim 4, wherein ranking the keywords extracted from the search results comprises determining the number of queries which result in at least one document that contains a respective keyword.

9. A computer system for filtering outbound content via inference detection, the computer system comprising:
  a processor;
  a memory coupled to the processor;
  an content-selection mechanism configured to identify previously sent content associated with a common first destination identifier;
  a keyword-extraction mechanism configured to extract a set of keywords from the identified previously sent content;
  a query mechanism configured to:
    issue a set of web search queries that each includes one or more of the extracted keywords to obtain a set of search results;
    extract a set of candidate keywords from the set of search results;
  an inference detection mechanism configured to perform inference detection using the set of search results for the extracted keywords;
  an expected-content mechanism configured to determine, from the set of candidate keywords, a set of expected-content keywords which are determined to be representative of the previously sent content based on the inference detection;
  a receiving mechanism configured to determine whether outbound content is proper in response to receiving a piece of outbound content with another destination identifier, which involves performing one of;
    determining that the outbound content is associated with the first destination identifier, and the number of expected-content keywords present in the outbound content is below a first predetermined threshold; and
    determining that the outbound content is not associated with the first destination identifier, and the number of expected-content keywords present in the outbound content is above a second predetermined threshold; and
  a display mechanism configured to display the destination identifier for the outbound content and at least one expected-content keyword present in the outbound content, responsive to the outbound content being improper.

10. The computer system of claim 9, wherein the query mechanism is further configured to rank the expected-content keywords.

11. The computer system of claim 9, wherein while determining the expected-content keywords from the search results, the query mechanism is configured to determine a term-frequency inverse-document-frequency (TF.IDF) weight for a respective word or phrase contained in a respective document.

12. A computer system for filtering outbound content via inference detection, the computer system comprising:
a processor;
a memory coupled to the processor;
a receiving mechanism configured to receive a first piece of outbound content associated with a destination identifier;
a first keyword-extraction mechanism configured to extract keywords from the first piece of outbound content;
a query formulation mechanism configured to issue a set of web queries that each includes one or more of the extracted keywords to obtain a set of search results;
a second keyword-extraction mechanism configured to extract a set of candidate keywords from the search results returned by a search engine in response to the queries;
an inference detection mechanism configured to perform inference detection using the set of search results for the extracted keywords;
an expected-content mechanism configured to determine, from the set of candidate keywords, a set of expected-content keywords which are determined to be representative of the previously sent content based on the inference detection;
a ranking mechanism configured to rank the set of candidate keywords extracted from the search results based on a confidence value generated using web-based inference detection, wherein the confidence value evaluates the candidate keyword's sensitivity to expected content;
a selection mechanism configured to select one or more top ranked keywords to represent the first piece of outbound content;
an inspection mechanism configured to determine whether outbound content is proper in response to receiving a second piece of outbound content, which involves performing one of:
determining that the second piece of outbound content is associated with the first destination identifier, and the number of expected-content keywords present in the second piece of outbound content is below a first predetermined threshold; and
determining that the second piece of outbound content is not associated with the first destination identifier, and the number of expected-content keywords present in the second piece of outbound content is above a second predetermined threshold; and
a display mechanism configured to display the destination identifier for the second piece of outbound content, the selected one or more top ranked keywords to represent the first piece of outbound content, and at least one expected-content keyword selected to represent the second piece of outbound content in response to the second piece of outbound content being improper, thereby allowing a user to determine whether the second piece of outbound content has the proper content and destination identifier.

13. The computer system of claim 12, wherein while extracting keywords from the first piece of outbound content, the first keyword-extraction mechanism is configured to determine a TF.IDF weight for a respective word or phrase contained in the outbound content.

14. The computer system of claim 12, wherein while extracting keywords from the search results, the second keyword-extraction mechanism is configured to determine a TF.IDF weight for a respective word or phrase contained in a respective document.

15. The computer system of claim 12, wherein while ranking the keywords extracted from the search results, the ranking mechanism is configured to determine the number of documents which contain a respective keyword.

16. The computer system of claim 12, wherein while ranking the keywords extracted from the search results, the ranking mechanism is configured to determine the number of queries which result in at least one document that contains a respective keyword.

* * * * *